No. 671,443. Patented Apr. 9, 1901.
W. C. JENNINGS.
ROTARY GATE VALVE.
(Application filed July 31, 1900.)
(No Model.)
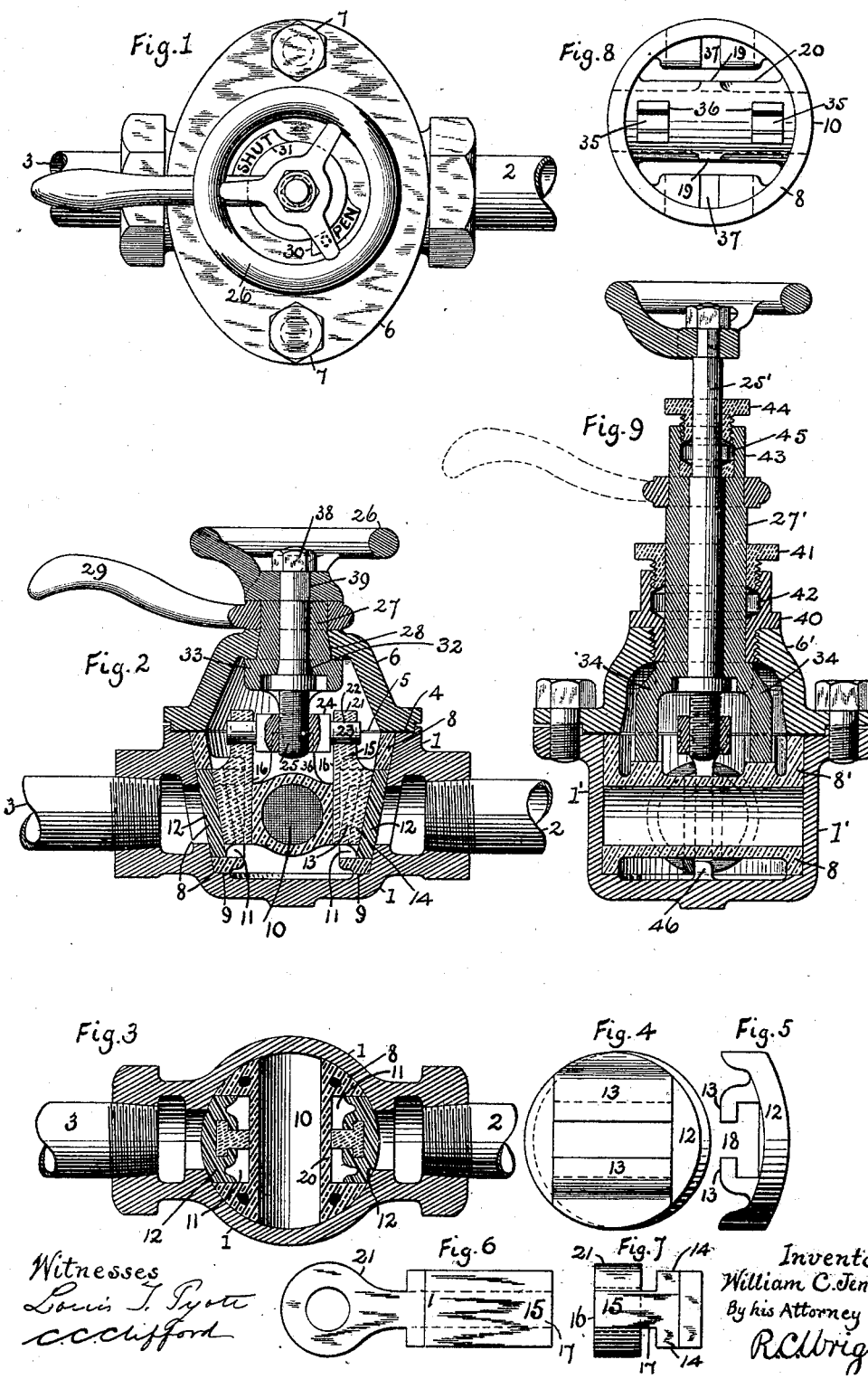

UNITED STATES PATENT OFFICE.

WILLIAM C. JENNINGS, OF CAMDEN, NEW JERSEY, ASSIGNOR TO THE W. C. JENNINGS CO., OF SAME PLACE.

ROTARY GATE-VALVE.

SPECIFICATION forming part of Letters Patent No. 671,443, dated April 9, 1901.

Application filed July 31, 1900. Serial No. 25,410. (No model.)

*To all whom it may concern:*

Be it known that I, WILLIAM C. JENNINGS, a citizen of the United States, residing at Camden, in the county of Camden and State of New Jersey, have invented certain new and useful Improvements in Rotating Gate-Valves, of which the following is a specification.

My invention relates to valves used to control fluid-flowing, and has for its objects, first, to present an unobstructed passage for the flow when the valve is opened; second, to furnish means exterior to the valve-case to securely close the pipes and prevent any flow when the valve is closed, and, third, to readily ease the valves for free movement and as readily lock them in either open or closed position and without any special training or skill on the part of the operator, who simply turns a hand-wheel to loosen and by a quarter-turn of a lever from "open" to "shut," or vice versa, does the work. My valve is also perfectly safe for the operator, as no steam, gas, or vapor can escape from its case to do any damage, and the valve can be securely locked in either open or closed position, as will be further pointed out in the specification.

The means I employ in my invention are illustrated in the accompanying drawings, in which—

Figure 1 is a top view. Fig. 2 is a vertical central section. Fig. 3 is a horizontal section through the center of the port and valves. Fig. 4 is a plan of the valves. Fig. 5 is an end view of the valves. Fig. 6 is a plan view of the valve-wedge. Fig. 7 is an end view of the valve-wedge. Fig. 8 is a plan or upper end view of the valve-cage. Fig. 9 is a modification.

Similar figures of reference indicate similar parts throughout the views.

A case 1 is provided, which is closed at its bottom, (but which may be provided with a drain cock or plug,) has an inlet 2, an outlet 3, and a circular recess 4 at its top, in which is placed a gasket 5 and which is held in the recess by a cover 6, having bolts 7 for such purpose. It will be readily understood that cover 6 could be screwed on, if desirable, and that the inlet and outlet pipes could be attached by coupling nuts or flanges. The case 1 is tapered from the bottom up, and therein is placed a free-fitting tapered cage 8, which seats upon a ledge 9 at the bottom of the case and abuts cover 6 at its top. Cage 8 has a horizontal port 10, extending across from side to side, made integral with the side wall of the cage and in line with inlet 2 and outlet 3 when set for fluid-flowing. At right angles to port 10 are circular valve-pockets 11, into which are placed disk valves 12, having upon their backs L-shaped guides 13, within which are inserted the flanges 14 of valve-wedges 15, the wedges standing vertical at their inner side 16 and having their flanges 14 inclined at the same angle as the sides of cage 8 and the L-guides of valves 12 when placed in their pockets 11. The backs 16 of wedges 15 are connected to the flanges 14 by a tongue 17, forming a T-section, which passes into space 18 between valve L-guides 13, while backs 16 move up and down against faces 19, formed on cover 20 of port 10. At the upper end of wedges 15 a hub 21 is formed, and therein is a bearing 22, which receives a journal 23 of a trunnioned nut 24, placed between the wedges 15. The nut 24 is tapped at its center to receive a stem 25, secured to and operated by a hand-wheel 26. Stem 25 passes through a sleeve 27, which is taper-fitted at 28, where it seats in cover 6, and above the cover has attached to it a handle 29, the handle being limited as to its movement by stop 30 (open) and stop 31, (shut,) secured to or formed on cover 6. Stem 25 is taper-fitted at 32, where it seats in sleeve 27. Sleeve 27 has a hub 33 under cover 6, and reaching outward and downward therefrom are arms 34, (best seen in Fig. 9,) which enter notches 35 in lugs 36, formed on the top of cover 20 of port 10.

There are slots 37 in the top of valve-pockets 11 for the insertion of tongues 17 of wedges 15.

A nut 38 forces taper 32 of stem 25 to its seat, secures hand-wheel 26 on rectangle 39, and also forces taper 28 to its seat, thus securing safety from leakage.

In Fig. 9 I show a modification in which shell 1' is straight, and therein is placed a straight cage 8', and as in some instances and for some uses it is desirable to have packing around stem 25' and sleeve 27' therefore I have screwed a stuffing-box 40 into cover 6' and secured to it a gland 41 to compress packing in a pocket 42, and upon the top of sleeve 27' I have formed a stuffing-box 43, having a gland 44, compressing packing in a pocket 45. A stop 46 within the bottom of case 1' limits the movement of cage 8'.

To operate my valve, or when it is closed to open it, the hand or locking wheel 26 must first be slightly turned to screw stem 25 into the trunnioned nut 24. This will raise valve-wedges 15 and release the disk valves 12 from contact with the inner face of case 1, against which they are seated. The valve is now unlocked and free to move, and handle 29 is simply moved around to stop 30 (open) and free and unobstructed connection is secured by inlet 2 to outlet 3 through port 10. A reverse movement of the handle 29 to and against stop 31 (shut) will cut off the passage through port 10. Then hand-wheel 26 being turned to screw-stem 25 out of trunnioned nut 24 the valves 12 will be again seated to case 1 and the inlet and outlet closed and the valve securely locked, as seen in Figs. 2, 3, and 9.

By my mechanism a perfectly safe valve is secured, as I provide against any leakage, have means easily worked for its operation, easily repaired or inspected, as by removing cap 6 all parts are removed without breaking pipe connections, and by means of hand-wheel 26 and its attachments valves 12 may be forced to the case 1, locking the valve in either open or closed position and without resorting to the tight fits in the usual forms of valves, which are hard to operate, dangerous on account of liability to breakage, and cannot be locked.

I claim—

1. In a valve, a circular and tapered case inclosed at the bottom, an inlet and an outlet therefor, a recess at the top of the case, packing inserted therein, a cover secured to the case and bearing upon the packing, a circular and tapered cage inserted in the case, rotatable therein and having therethrough a port adapted to form a continuous passage from the inlet to the outlet, circular valve-pockets in the cage, disk valves in the pockets, L-shaped guides upon the valves, tapered T-section wedges in the guides and supported upon a trunnioned nut, and means exterior to the case to elevate or depress the trunnioned nut and thereby lock or unlock the valves, and separate means also operated exterior to the case to rotate the cage aforesaid, in manner and form substantially as set forth.

2. In a valve, a circular and tapered case, an inlet and an outlet therefor, a circular and tapered cage within the case, a port through the cage, valve-pockets in the cage and placed at about right angles to the port aforesaid, disk valves in the pockets, guides upon the valves, wedges operative in the guides, a trunnioned nut whereon the wedges are operatively placed, and means operated from the exterior of the case to seat the valves against the case, and to free them from said seating, in manner and form substantially as set forth.

3. In a valve, a case therefor, an inlet and an outlet for the case, a rotatable cage within the case, and a port through the cage, disk valves seated in the cage, guides upon each valve, a wedge entering the guides, means to lower and raise the wedges and thereby press the valves to the case or release the pressure, a stem reaching out of the cage and having means within the case for operative connection with the wedges aforesaid, and a sleeve seated in the case, having arms for engaging notches in the cage within the case, and exterior to the case having separate means whereby the sleeve and the cage may be rotated when the valves are unlocked or relieved from pressure against the case, substantially as described.

In testimony whereof I affix my signature in presence of two witnesses.

WILLIAM C. JENNINGS.

Witnesses:
R. C. WRIGHT,
W. H. ALCOCK.